United States Patent [19]
Walker

[11] 3,870,914
[45] Mar. 11, 1975

[54] CURRENT COLLECTION MEANS FOR ELECTRIC MOTORS

[76] Inventor: Alan J. Walker, 387 Maidstone Rd., Gillingham, England

[22] Filed: Feb. 26, 1973

[21] Appl. No.: 335,469

Related U.S. Application Data

[63] Continuation-in-part of Ser. No. 157,576, June 28, 1971, Pat. No. 3,751,698.

[52] U.S. Cl............ 310/219, 310/231, 310/114, 310/105
[51] Int. Cl. .......................................... H02k 13/10
[58] Field of Search ............. 310/219, 232, 231, 40, 310/46, 431, 145, 114, 112, 126, 105, 103

[56] References Cited
UNITED STATES PATENTS

| | | | |
|---|---|---|---|
| 2,066,343 | 1/1937 | Gillen | 310/46 |
| 2,347,590 | 4/1944 | Binder | 310/231 UX |
| 2,401,166 | 5/1946 | Kobel | 310/219 X |
| 2,669,667 | 2/1954 | Haines | 310/231 X |
| 2,782,720 | 2/1957 | Dochterman | 310/43 X |

FOREIGN PATENTS OR APPLICATIONS

| | | | |
|---|---|---|---|
| 893,077 | 9/1953 | Germany | 310/126 |

*Primary Examiner*—Donovan F. Duggan
*Attorney, Agent, or Firm*—Pennie & Edmonds

[57] ABSTRACT

An electric motor in which the communicating means is controllable and operable individually of the armature of the motor to effect a speed control for the motor.

An electric motor the communicating means of which has fixed electric contacts which are an integral multiple of the coils of the motor stator whereby the rate of operation of the commutating means with respect to the rate of operation of the motor is reduced.

An electric motor the commutating means of which utilizes a liquid metal to effect an electrical connection between fixed and moving contacts.

3 Claims, 7 Drawing Figures

CURRENT COLLECTION MEANS FOR ELECTRIC MOTORS

REFERENCE TO OTHER APPLICATIONS

The application is a continuation-in-part of my copending application Ser. No. 157,576 filed June 28, 1971 now U.S. Pat. No. 3,751,698.

BACKGROUND OF THE INVENTION

The invention relates to an electric motor having an armature which is driven by a rotating magnetic field produced by a stator having conductive coils where the current supply to the coils is through non-rotatable or fixed contacts of a commutating means. The non-rotatable contacts in turn are successively connected electrically to rotatable or moveable contacts which are connected to a voltage source.

DESCRIPTION OF THE PRIOR ART

Electric motors driven by a rotating magnetic field produced by a stator have the advantage that the armatures of such machines, which may have permanent magnetic or induced poles, do not require any external electrical connections, for example brushes, between the stator and the armature. Such motors are particularly suitable as drives for fluid pumps as the armature may be placed directly in the pump chamber containing the fluid to be pumped and attached directly to the pump impeller. In such instances the stator is hermetically isolated with respect to the pump fluid by a magnetic permeable wall placed between the stator and the armature. Such motors, often called "wet" armature motors or sometimes, especially in the pump art, called "canned" motors, have the advantage that they do not possess shaft seals which would have a tendency to leak. Thus such motors are not subjected to any continued maintenance of shaft seals or to any friction imparted by shaft seals.

The disadvantage however of such motors is that their rotational speed is determined by the frequency of the power supplied or by the number of stator poles of the motor. Speed control of such motors is difficult to achieve, and usually incurs penalties such as loss of torque and reduced power factors. In practice, therefore, when variable speed drives are required, the motors are used in conjunction with speed changing means such as infinitely variable friction drives, gearboxes (as in machine tools for example), hydraulic converters and the like.

Where it is desired to obtain higher pumping pressures with such motors, either larger impellers must be used with narrow flow passages resulting in lower pump efficiency, or multi-stage designs must be used. A further way of increasing pumping pressure when using such electric motors is to use a DC power source where the poles of the source are connected by a commutating means in a timed sequence to individual coils of the stator. In this manner rotational speed of the armature and pump impeller is determined by the switching frequency of the commutating means. In conventional motors of the type described, this frequency cannot be arbitrarily increased to increase the speed of the motor as the wear of the contacts in the commutating means increases exponentially with the frequency.

It is therefore an object of my invention to provide means by which motors of the type described may have a variable rotational speed independent of the frequency of the voltage source and have a maximum speed limited only by the mechanical stresses of the parts making up the armature and pump impeller.

It is a further object of the invention to reduce the frequency of engagement between moveable and fixed contacts of a commutating means of the type of electric motor described in order to reduce wear of the contacts and to make their service life more equal to the service life of the remaining parts of the motor and any unit to which it might be attached, i.e. a pump.

It is still a further object to increase service life of the contacts of a commutating means by spacing the fixed and moveable contacts from each other so that there will be no physical engagment between the two but sufficiently close together whereby an electrical connection between the two contacts may be made by a liquid metal.

SUMMARY OF THE INVENTION

Broadly the invention comprises an electric motor having a stator with a plurality of induction coils for generating a rotating magnetic electric field where the armature of the motor is driven by the rotating magnetic field. The motor has a commutating means which includes a number of non-rotatable or fixed contacts which are electrically connected to the individual stator coils, a number of rotatable or moveable contacts which are connected to a voltage source and which are adapted to be brought into successive electrical contact with the non-rotatable contacts by a rotation means which rotates the rotatable contacts. The number of non-rotatable contacts is an integral multiple greater than 1 of the number of coils in the stator whereby the frequency by which each individual non-rotatable contact is contacted by a rotatable contact is reduced thus increasing contact service life.

The invention also comprises in one embodiment means for increasing the service life of the contacts of the commutator means by spacing the non-rotatable and rotatable contacts from each other so that they never physically engage but sufficiently close that the contacts will provide a capillary effect for a liquid metal, i.e. mercury, for bridging the clearance between the contacts to make the electrical connection.

A still further embodiment of the invention comprises an auxiliary motor means to provide the means for rotating the rotatable contacts of the commutating means and to provide speed control means for the auxiliary motor whereby the speed of the electric motor may be easily varied. The auxiliary motor and commutating means may be physically separated from the electric motor and connected thereto by wiring.

DETAILED DESCRIPTION OF THE PREFERRED EMBODIMENT

Figure 1:
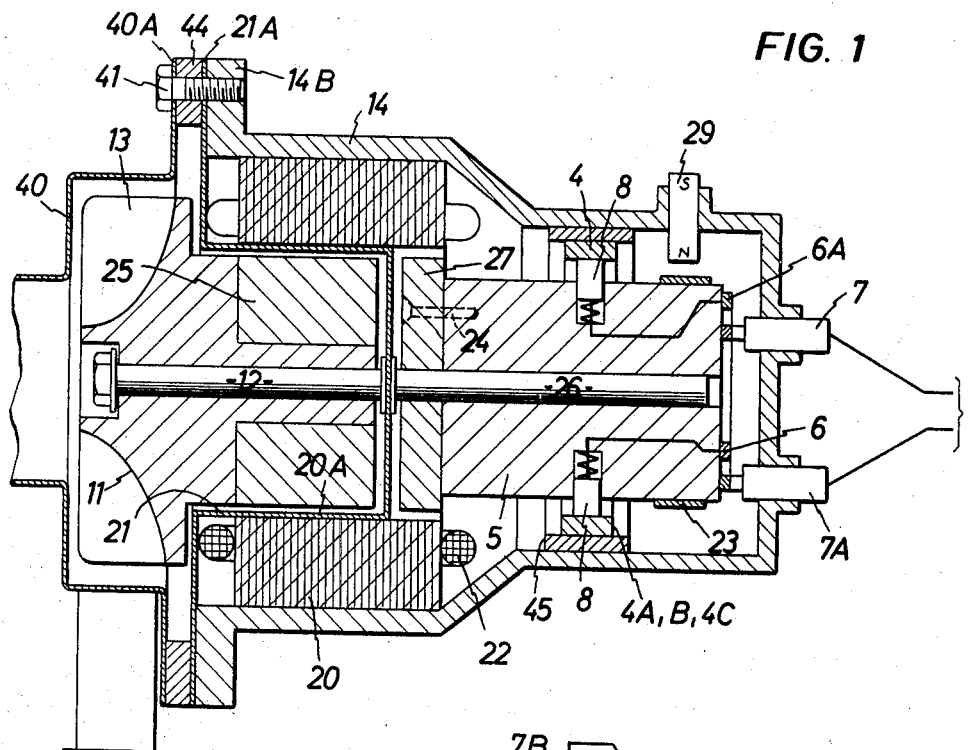
FIG. 1 is a side elevational view of an electric motor constructed according to the invention having a commutator means formed in part by an auxiliary rotor of an auxiliary motor and where the electric motor is used to drive a pump impeller.

FIG. 1 illustrates an electric motor according to the invention for use in driving the impeller of a centrifugal pump. As shown, the motor comprises a stator 20 having a plurality of inductive windings or coils 22 where the stator is fixed within a casing 14. The stator is separated from the pump chamber defined in part by casing 40 by a separating wall 21 comprising a non-magnetic material. Separating wall 21 is joined to casing 14 by means of bolts 41 which also with gasket 44 seal the casing 40 to casing 14. The rotor or armature 11 of the motor is positioned within the pump chamber and is rotatably mounted on shaft 12 which is fixed to the separating wall 21. The armature 11 has impeller blading 13 thereon and also has an annular permanent magnet 25 thereon which interacts with a rotating magnetic field generated by the stator 20 to provide the driving force for the rotor.

Commutator means are provided having fixed or non-rotatable rotatable contacts 4 which are formed as arcuate segments 4A, 4B, 4C, etc. mounted in an insulated ring 45 which in turn is fixed in the casing 14. Rotatable or moveable contacts 8 of the commutator are formed as brushes and are supported by a cylindrical insulating body 5 which is secured to an auxiliary rotor 27 by means of a screw 24. The brushes 8 are electrically connected to the voltage source by means of fixed brush-like connectors 7 and 7A and annular slip rings 6 and 6A. The brushes 8 are urged radially outwardly of the part 5, which may be considered part of the auxiliary rotor 27, by means of springs to engage the fixed contacts 4 which in turn are connected to the coils 22. A feature of the invention is that the number of contacts 4 is an integral multiple of the coils 22 so that the rotational speed of the rotatable or moveable contacts 8 is smaller by a reciprocal of the multiple than the rotational speed of the armature 11. This results in increased service life of the contacts, and by proper selection of the multiple can result in the contacts having a service life approximately that of the other parts of the electric motor or pump to which it may be connected so that one overhaul may service all parts.

The auxiliary rotor 27 is an inductive-type rotor and is rotatably mounted on shaft 26 which is fixed to separating wall 21. Rotor 27 is rotated by the magnetic forces produced by the stator coils 22. Rotational speed of rotor 27 and thus of the commutating means can be varied by means of braking devices. In the embodiment of FIG. 1, the braking device comprises a radially moveable permanent magnet 29 which acts with a conductive ring 23 carried by the body 5 to form an eddy current brake, the braking force of which increases as a magnet is moved towards the ring. When the speed of rotation of part 5 and rotor 27 is decreased, the rate of frequency change caused by the rotatable contacts engaging the fixed contacts is also decreased resulting in an effective decrease of current frequency to the coils 22 of the stator which in turn will reduce the rotational speed of armature 11. The eddy current brake for the auxiliary rotor thus serves as a speed control of the main electric motor.

While the commutating means of FIG. 1, comprising the auxiliary rotor and the fixed and rotatable contacts, is shown as being integral with the main electric motor, it could be physically separated therefrom. In such event an auxiliary stator would be provided to drive the auxiliary rotor and the coils of the stator of the main electric motor would be connected by wiring to the fixed contacts of the commutating means.

Figure 2:
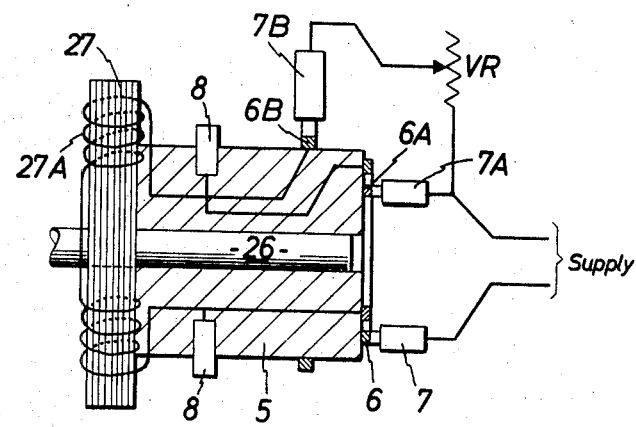
FIG. 2 is a sectional view of a portion of a different embodiment of the auxiliary rotor of an auxiliary motor for use in an electric motor of the type shown in FIG. 1.

FIG. 2 illustrates a further embodiment of an auxiliary rotor which would be substituted for that shown in FIG. 1. As shown, auxiliary rotor 27 is built up of a laminated magnetic material and has a winding 27A thereon. The winding 27A is connected to a voltage source via contacts 7A, 7B and by the slip rings 6 and 6A. A variable resistance VR is provided for varying the current passing through the windings 27A. As current through the winding 27A is increased, it will provide a braking force on the auxiliary rotor thus decreasing its rotational speed and rate of frequency change to the coils of the stator of the main electric motor. Thus, in this instance the variable resistance VR acts as a speed control for the main electric motor.

Figure 3:
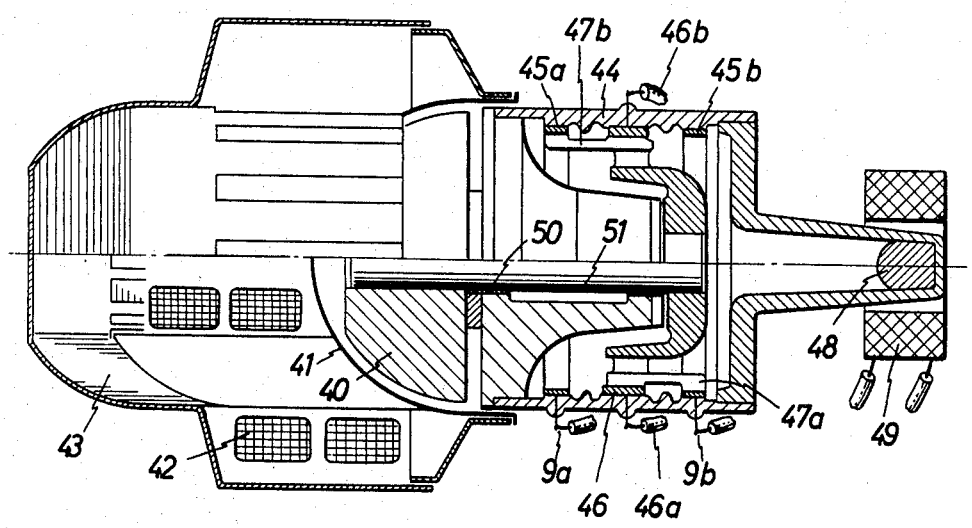
FIG. 3 is a side sectional view of the commutating means for an electric motor where the commutating means is driven by an auxiliary motor and wherein the electrical connection between the fixed and moveable contacts of the commutator is effected by a thin liquid metal film.

FIG. 3 illustrates a further embodiment of the invention wherein the commutating means is shown as a separate auxiliary motor which could be connected by wiring to the coils of a stator of a main electric motor not shown. The auxiliary motor comprises a stator 43 having coils 42 which generate a rotating magnetic field to rotate an armature 40 which is hermetically sealed with respect to the stator 43 by means of a separating wall 41. Armature 40 in turn is connected by means of shaft 51 to cup-like portions having thereon rotatable or moveable contacts 47A and 47B. Rotatable contacts 47A and 47B are spaced radially a small distance from two fixed insulated contacts 46. Coils of the stator of the main electric motor, not shown, are adapted to be connected by the leads 46A, 46B, etc. to the fixed insulated contacts 46. Contact rings 45A and 45B are connected by leads 9A and 9B to a voltage source and are spaced a small distance radially from the moveable contacts 47A and 47B.

The fixed portion of the commutating means comprising in part casing 44 forms part of a hermetic housing which encloses the fixed and rotatable contacts. One end of the housing has an auxiliary chamber for carrying a reserve of liquid metal 48 which is situated at the lowest point of the housing (the right-hand portion of FIG. 3 being the bottom of the auxiliary motor). A heating means 49 is provided by which the liquid metal in the auxiliary chamber may be vaporized. The radial spacing between the fixed contacts 46 and rings 45A, 45B on the one part and the rotatable contacts 47A and 47B on the other part is made small enough such that the spacing will provide a capillary attraction effect on the liquid metal which will condense at the contacts to thus draw liquid metal into the spacing. The metal is preferably mercury or a eutetic of potassium and sodium such that when it condenses at the contacts, it will provide an electrical bridge between the contacts. In this manner physical engagement of the contacts is prevented thus increasing the service life while still providing the desired bridge effect.

All of the fixed contacts, contact rings, and rotating contacts comprise a material, for example platinum, which is wettable by the liquid metal. The inside surface of the bearing bushes 50 and the outside of the shaft 51 also have wettable characteristics whereby bearing station friction is reduced.

The drive for the pole ring 40 can be provided by a single phase or a multi-phase AC power source or by a semiconductor AC generator of variable frequency. In addition instead of utilizing the stator 43 and rotor 49 as shown, the auxiliary rotor 27 as shown in FIG. 1 could take the place of the rotor 40 where the stator of the main electric motor would then be utilized to drive the auxiliary stator. As in the device of FIG. 1, the commutator means of FIG. 3 would have a number of fixed contacts 46 which would be an integral multiple of the number of coils of the stator of the main electric motor.

Figure 4:
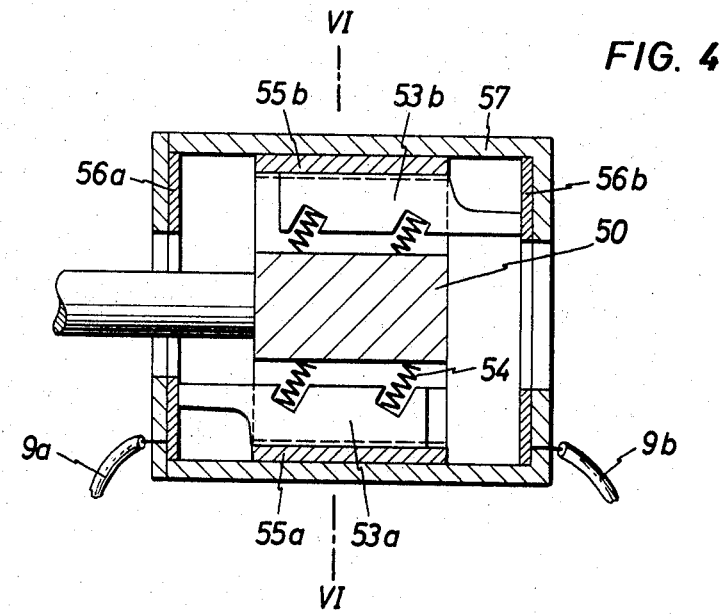
FIG. 4 is a side sectional view of a further embodiment of a commutating means applicable for use in a motor of the type illustrated in FIG. 1.

FIG. 4 illustrates a further embodiment of a commutating means having sliding contacts. As shown the rotatable part 50' is made of an insulating material and is adapted to be rotated by an auxiliary motor (not shown). The part 50' is provided with two diametrically opposed radial slots which contain two moveable contacts 53A and 53B made of a conducting material, for example graphite. The contacts are urged radially outwardly and axially of the part 50' by means of springs which are obliquely positioned within the slots. The contacts 53A and 53B engage segmental arcuate fixed contacts 55 which are fixed within the housing 52 and which are connected to the coils of the stator of the main electric motor. The rotating contacts 53A and 53B also engage contact rings 56A and 56B which are connected to a voltage source through leads 9A and 9B. The coils of the stator of the main motor which are connected to contacts 55A and 55B are thus connected with the voltage source via the rotating or moveable contacts 53A and 53B and the contact rings 56A and 56B. As in previous embodiments, the number of fixed contacts 55A and 55B is a integral multiple of coils of the stator of the main motor such that when the part 50' is rotated, the coils of the stator of the main electric motor are connected to the voltage source in a timed sequence such that a rotating magnetic field is generated to rotate the armature of the main electric motor.

Figure 5:
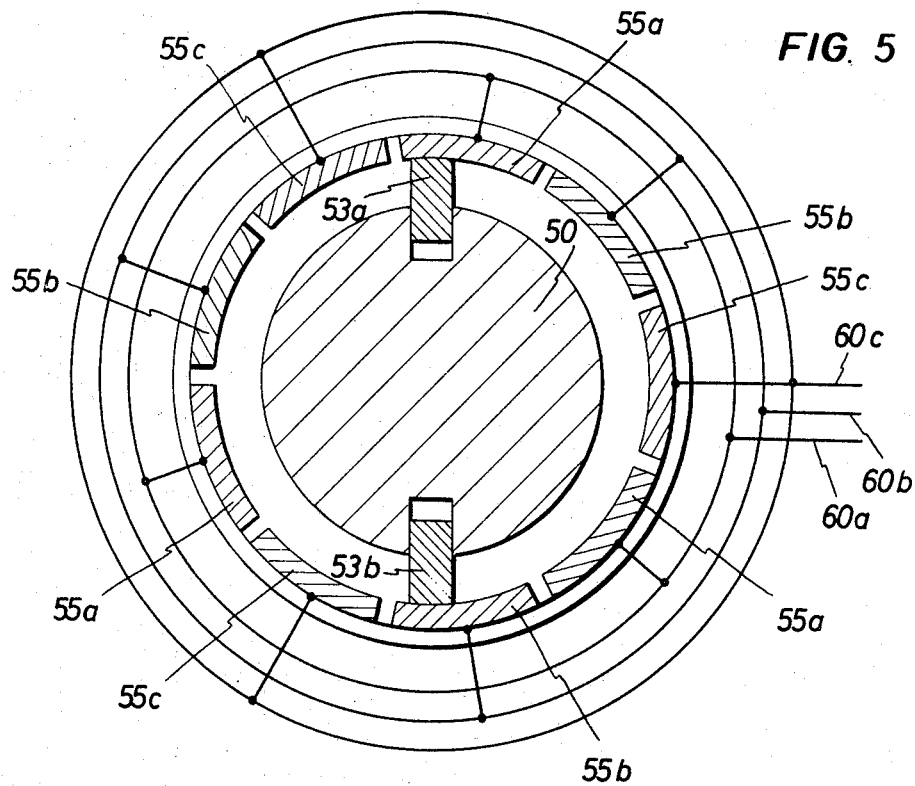
FIG. 5 is an enlarged view of the commutating means of FIG. 4 taken along lines V—V.

As shown in FIG. 5 which is a view of FIG. 4 taken along line V—V, the commutating means of FIG. 4 has nine fixed contacts 55 divided into three groups, 55A, 55B and 55C which are equally spaced in a cylindrical insulating casing 52. All fixed contacts of group 55A are electrically interconnected as are the contacts of groups 55B and 55C. The three groups of fixed contacts 55A, 55B and 55C are connected respectively to electrical leads 60A, 60B and 60C in star or delta formation. Because of the number of fixed contact groups is three times larger than the number of stator coils of the main electric motor, the rotational frequency of the magnetic field is three times higher than that of the commutating means. This results in an effective decrease in speed of rotation of the commutating means which results in an increased service life of the moveable and fixed contacts.

Instead of three contact groups as shown, any desired number of contact groups could be utilized so that the ratio of rotational frequencies of the motor and the commutating means can assume any desired value.

Figure 6A:
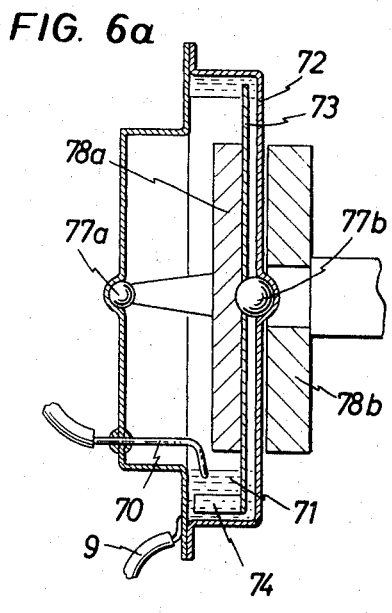
FIG. 6A is a cross-sectional view of a still further embodiment of a commutator means applicable for use with a motor of the type illustrated in FIG. 1.
Figure 6B:
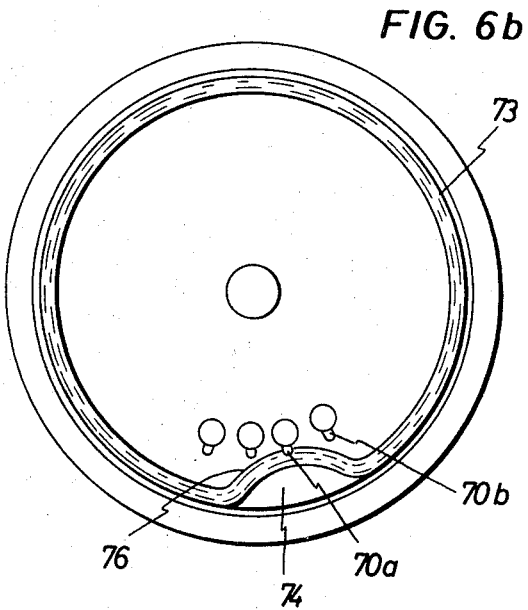
FIG. 6B is a diagrammatical view of an end portion of FIG. 6A.

FIG. 6A illustrates a further form of a commutating means in which the electrical connection between fixed contacts 70 leading to the coils of a stator winding and the conductor 9 leading to a voltage source is effected by means of liquid mercury 71. A container 72 encloses the fixed contacts and also has a rotatable disc therein which dips into a pool of mercury carried by the container. When the disc is rotated, it will in turn rotate the mercury but at a smaller peripheral speed. Centrifugal forces acting on the mercury will cause it to move to the radially outer wall of the container 72 and to form an annular body of liquid metal. A streamlined body 74 is mounted on the disc and causes a wave of mercury having a crest 76 to form since the disc 73 and body 74 are moving faster than the mercury within the container. The crest 76, as shown in FIG. 6B, will engage a fixed contact 70A such that a crest of mercury acts in the manner of a moving contact. The crest will contact only one of the fixed contacts at any given period of time.

The drive of the disc comprises a magnetic coupling formed by annular magnets 78A and 78B. Magnet 78A is rotatably carried by spherical bearing elements 77A and 77B. Magnet 78B is connected to a separate auxiliary motor or to an auxiliary rotor such as included in FIG. 1.

The container 72 is connected by a lead 9 to one pole of a voltage source. In order to operate an electric motor according to the invention, two of the devices as shown in FIG. 6A would be needed, one each being connected to a pole of a voltage source.

I claim:

1. An electric motor comprising a stator having a plurality of inductive coils for generating a rotating magnetic field, an armature rotatably driven by said magnetic field, commutator means including fixed contacts electrically connected with each inductive coil, rotatable contacts connected to a source of voltage, and rotation means for rotating said rotatable contacts in succession with said fixed contacts whereby said coils of said stator are successively connected to the voltage source: the improvement comprising in that the number of fixed contacts is an integral multiple of the number of coils of said stator; in that each fixed contact comprises an arcuate segment mounted on a common insulating ring; in that each rotatable contact comprises a rotatable brush the polarity of which alternates as it rotates in a circumferential direction; in that said rotation means comprises an auxiliary electric motor having an auxiliary induction rotor mounting said rotatable contacts; in that the stator of the electric motor serves as an auxiliary stator for the auxiliary motor; and, in that the auxiliary induction rotor carries a rotor winding which is electrically connected to the voltage source whereby said auxiliary electric motor uses part of the current supplied to the electric motor such that an increase in current to said rotor winding decreases the rotational speed of the auxiliary rotor and the electric motor.

2. An electric motor comprising a stator having a plurality of inductive coils for generating a rotating magnetic field, an armature rotatably driven by said magnetic field, commutator means including fixed contacts electrically connected with each inductive coil, rotatable contacts connected to a source of voltage, and rotation means for rotating said rotatable contacts to electrically connect said rotatable contacts in succession with said fixed contacts whereby said coils of said stator are successively connected to the voltage source: the improvement comprising in that the number of fixed contacts is an integral multiple of the number of coils of said stator; in that each fixed contact comprises an arcuate segment mounted on a common insulating ring; in that each rotatable contact comprises a rotatable brush the polarity of which alternates as it rotates in a circumferential direction; in that said rotation means comprises an auxiliary electric motor having an auxiliary induction rotor mounting said rotatable contacts; in that the auxiliary rotor has thereon a ring of high electrical conductivity; and in that a radially moveable magnet is spaced from said ring by which eddy currents are generated in the ring and whereby radial movement of the magnet with respect to the ring will vary the intensity of the eddy currents in the ring to effect a braking force on the rotor and thus vary the rotational speed of the rotor.

3. An electric motor comprising a stator having a plurality of inductive coils for generating a rotating magnetic field, an armature rotatably driven by said magnetic field, commutator means including fixed contacts electrically connected with each inductive coil, rotatable contacts connected to a source of voltage, and rotation means for rotating said rotatable contacts to electrically connect said rotatable contacts in succession with said fixed contacts whereby said coils of said stator are successively connected to the voltage source: the improvement comprising in that the number of fixed contacts is an integral multiple of the number of coils of said stator; in that each fixed contact comprises an arcuate segment mounted on a common insulating ring; in that each rotatable contact comprises a rotatable brush the polarity of which alternates as it rotates in a circumferential direction; in that said rotation means comprises an auxiliary electric motor having an auxiliary induction rotor mounting said rotatable contacts; in that the auxiliary rotor has thereon a ring of high electrical conductivity; and in that a moveable magnet is spaced from said ring by which eddy currents are generated in the ring and whereby movement of the magnet with respect to the ring will vary the intensity of the eddy currents in the ring to effect a braking force on the rotor and thus vary the rotational speed of the rotor.

* * * * *